(12) United States Patent
Sakai et al.

(10) Patent No.: US 11,135,585 B2
(45) Date of Patent: Oct. 5, 2021

(54) FLUID CONTROL DEVICE, MICROPARTICLE MEASUREMENT DEVICE, AND FLUID CONTROL METHOD

(71) Applicant: SONY CORPORATION, Tokyo (JP)

(72) Inventors: Yoshitsugu Sakai, Kanagawa (JP); Ichiro Fujii, Chiba (JP); Ryoichi Kubota, Chiba (JP); Shinichi Hasegawa, Chiba (JP); Takashi Miyata, Kanagawa (JP); Emi Ikeda, Kanagawa (JP)

(73) Assignee: SONY CORPORATION, Tokyo (JP)

(*) Notice: Subject to any disclaimer, the term of this patent is extended or adjusted under 35 U.S.C. 154(b) by 340 days.

(21) Appl. No.: 16/305,768

(22) PCT Filed: Mar. 7, 2017

(86) PCT No.: PCT/JP2017/008863
§ 371 (c)(1),
(2) Date: Nov. 29, 2018

(87) PCT Pub. No.: WO2017/212717
PCT Pub. Date: Dec. 14, 2017

(65) Prior Publication Data
US 2020/0324286 A1   Oct. 15, 2020

(30) Foreign Application Priority Data
Jun. 10, 2016  (JP) .............................. JP2016-116691

(51) Int. Cl.
*B01L 3/00*   (2006.01)
(52) U.S. Cl.
CPC ..... *B01L 3/50273* (2013.01); *B01L 3/502715* (2013.01); *B01L 2300/041* (2013.01);
(Continued)

(58) Field of Classification Search
CPC ..... B01L 2400/0481; B01L 2400/0487; B01L 2300/0816; B01L 2300/06;
(Continued)

(56) References Cited

U.S. PATENT DOCUMENTS 5,919,360 A   7/1999 Contaxis et al.
2001/0052525 A1*  12/2001 Diaz .................... B67D 7/0255
                                                        222/1
(Continued)

FOREIGN PATENT DOCUMENTS

AU   4049500 A   10/2000
EP   1210290 A1   6/2002
(Continued)

OTHER PUBLICATIONS

Nippon Becton Dickinson Kabushiki, "BD FACSCanto II Flow Cytometer", Sep. 1, 2006, 3 pages.
(Continued)

*Primary Examiner* — Jennifer Wecker
*Assistant Examiner* — Kathryn Elizabeth Limbaugh
(74) *Attorney, Agent, or Firm* — Chip Law Group

(57) ABSTRACT

The present technology is mainly directed to providing a technology that enables smooth setting of sheath liquid. Provided is a fluid control device including at least a support portion that supports a sheath liquid storage unit and a sealed portion that houses the support portion. The support portion is detachable from the sealed portion, and the sealed portion is controlled by pressurization in order to feed sheath liquid stored in the sheath liquid storage unit to a microparticle measurement device.

10 Claims, 8 Drawing Sheets

(52) U.S. Cl.
CPC ..... *B01L 2300/047* (2013.01); *B01L 2300/06* (2013.01); *B01L 2300/0816* (2013.01); *B01L 2400/0487* (2013.01)

(58) Field of Classification Search
CPC ......... B01L 2300/041; B01L 2300/047; B01L 3/5027; B01L 2200/141; B01L 2200/027; B01L 3/502715; G01N 2015/149; G01N 2015/1309; G01N 15/1404; G01N 35/95
See application file for complete search history.

(56) References Cited

U.S. PATENT DOCUMENTS

| | | | | |
|---|---|---|---|---|
| 2005/0011582 | A1* | 1/2005 | Haug | G01N 15/1404 141/65 |
| 2006/0118167 | A1* | 6/2006 | Neas | G01N 15/1484 137/67 |
| 2011/0074451 | A1 | 3/2011 | Yamaguchi | |
| 2015/0118743 | A1* | 4/2015 | Hanamura | C12N 15/1003 435/293.1 |

FOREIGN PATENT DOCUMENTS

| | | |
|---|---|---|
| JP | 51-14387 A | 2/1976 |
| JP | 51-014387 A | 2/1976 |
| JP | 2006-060770 A | 3/2006 |
| JP | 2011-069713 A | 4/2011 |
| JP | 2015-503730 A | 2/2015 |
| WO | 2000/058202 A1 | 10/2000 |
| WO | 2006/060770 A2 | 6/2006 |

OTHER PUBLICATIONS

International Search Report and Written Opinion of PCT Application No. PCT/JP2017/008863, dated May 16, 2017, 02 pages of translation and 07 pages of ISRWO.
"BD FACSCanto II", 07B1X00003000102, Sep. 2006, 3 pages.
Office Action for JP Patent Application No. 2018-522326 dated Feb. 2, 2012, 4 pages of Office Action and 4 pages of English Translation.
'BD FACSCantoThe II flow cytometer, Nippon Becton Dickinson, Inc., Sep. 1, 2006, 3 pages.

* cited by examiner

FIG.7
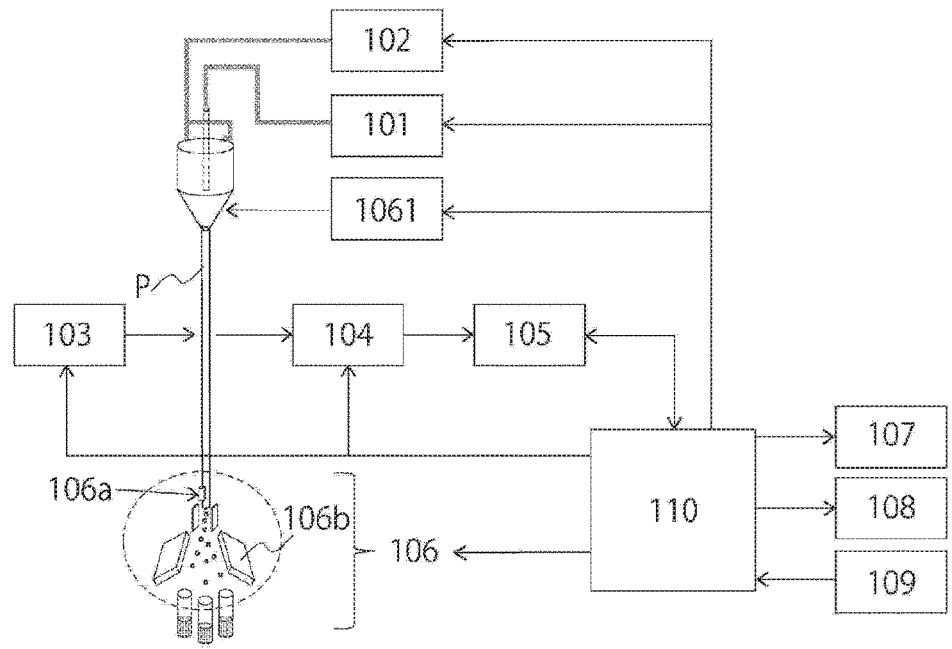
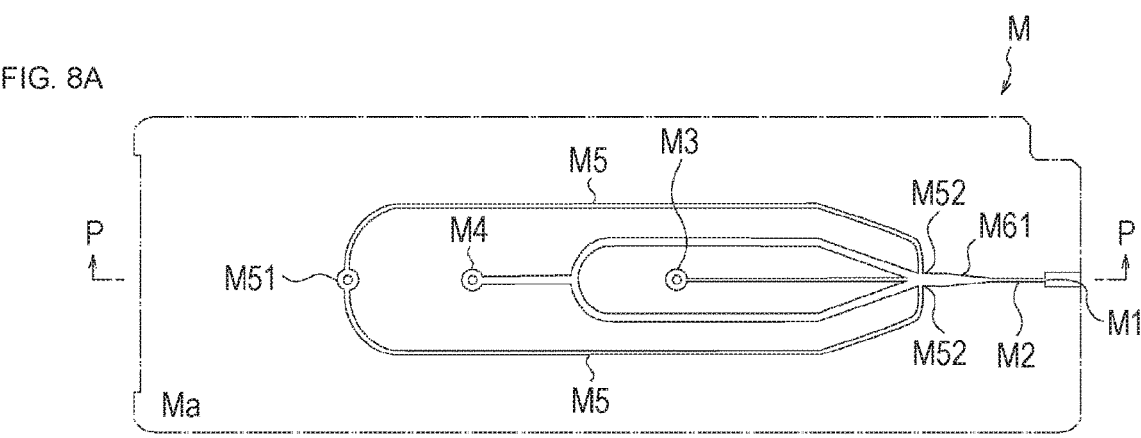
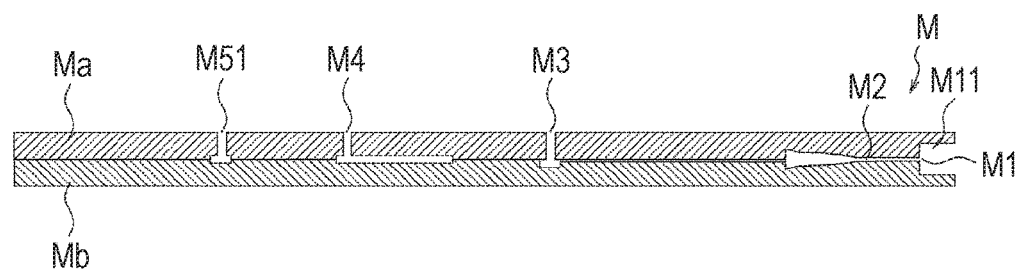

FLUID CONTROL DEVICE, MICROPARTICLE MEASUREMENT DEVICE, AND FLUID CONTROL METHOD

CROSS REFERENCE TO RELATED APPLICATIONS

This application is a U.S. National Phase of International Patent Application No. PCT/JP2017/008863 filed on Mar. 7, 2017, which claims priority benefit of Japanese Patent Application No. JP 2016-116691 filed in the Japan Patent Office on Jun. 10, 2016. Each of the above-referenced applications is hereby incorporated herein by reference in its entirety.

TECHNICAL FIELD

The present technology relates to a fluid control device, a microparticle measurement device, and a fluid control method.

BACKGROUND ART

In recent years, regenerative medicine and cell therapy are active fields of research, and the need for a flow cytometer is increased as a technique to quickly evaluate a cell. The flow cytometer is an analysis technique to analyze and sort a microparticle by detecting fluorescence and scattered light emitted from each microparticle after pouring, into a fluid, microparticles to be analyzed in an aligned state and emitting laser light or the like to the microparticles, and the flow cytometer is used as a tool to analyze a cell in the research on the regenerative medicine and cell therapy. In the above-described research, a flow cytometer capable of performing processing in an aseptic environment is demanded because it is necessary to reduce a risk of cell contamination.

To perform processing in an aseptic space, it is desirable that sheath liquid that contacts a cell during analysis is also in an aseptic state. For example, Patent Document 1 discloses a microparticle measurement device in which a bag conserving sheath liquid is preserved inside a sheath tank and feeding of the sheath liquid is controlled.

CITATION LIST

Patent Document

Patent Document 1: International Publication No. WO 2006/060770

SUMMARY OF THE INVENTION

Problems to be Solved by the Invention

However, in a device in the related art, since sheath liquid is preserved in the sheath tank as it is, there is a problem that the sheath liquid cannot be smoothly set. Specifically, an operator needs to attach a tube to a bag (sheath liquid storage unit) or the like that conserves sheath liquid in a clean bench and then move the bag into the sheath tank, and when this operation is carried out inside the clean bench, there may be a case where the tube cannot be attached properly. Additionally, in a conventional device, it is necessary to carry the entire sheath tank having heavy weight, and this is a great burden to an operator. Thus, quite complicated operation is conventionally required to set the sheath liquid.

Therefore, the present technology is mainly directed to providing a technology that enables smooth setting of sheath liquid.

Solutions to Problems

In the present technology, first provided is a fluid control device including at least: a support portion that supports a sheath liquid storage unit; and a sealed portion that houses the support portion, in which the support portion is detachable from the sealed portion, and the sealed portion is controlled by pressurization in order to feed sheath liquid stored in the sheath liquid storage unit to a microparticle measurement device.

In the fluid control device according to the present technology, the support portion further may include an attachment portion to attach the sheath liquid storage unit, and a position of the attachment portion may be visible from the outside of the support portion.

Additionally, in the fluid control device according to the present technology, the sealed portion may further include a lid that seals the sheath liquid storage unit, and the lid may include a through hole through which a liquid feeding tube to feed sheath liquid stored in the sheath liquid storage unit to a microparticle measurement device passes. In this case, the liquid feeding tube may be provided with a fitting portion to be fitted into the through hole. Additionally, the support portion may further include a place to set the fitting portion.

Furthermore, the fluid control device according to the present technology may further include a liquid drain unit that stores liquid drained from the microparticle measurement device. In this case, an installation table on which the sealed portion and the liquid drain unit are installed may be further included. Additionally, the installation table may further include a drain control unit that controls storage of liquid to be drained to the liquid drain unit. Furthermore, the installation table may further include a connection portion to connect a liquid drain tube that drains liquid to the liquid drain unit from the microparticle measurement device. Additionally, the installation table may further include a vibration control unit that controls vibration of the sealed portion.

Furthermore, the present technology also provides a microparticle measurement device to which the fluid control device according to the present technology is connected.

Furthermore, in the present technology, provided is a fluid control method using at least a support portion that supports a sheath liquid storage unit and a sealed portion that houses the support portion, the support portion being detachable from the sealed portion, the method including controlling the sealed portion by pressurization in order to feed sheath liquid stored in the sheath liquid storage unit to a microparticle measurement device.

In the present technology, the "microparticle" broadly includes, for example: biologically relevant microparticles such as cells, microbes, and liposomes; synthetic particles such as a latex particle, a gel particle, a particle for an industrial use; or the like.

Additionally, the biologically relevant microparticles include a chromosome, a liposome, a mitochondrion, an organelle (cell organ), and the like constituting various kinds of cells. The cells include animal cells (such as hematopoietic cell) and plant cells. The microbes include: bacteria such as *coli bacilli*; viruses such as tobacco mosaic viruses; fungi such as yeast; and the like. Additionally, the biologically relevant microparticles can also include biologically relevant polymers such as nucleic acids, proteins, and a complex thereof. Additionally, the particle for an industrial use may be, for example, an organic or inorganic polymer material, a metal, or the like. The organic polymer materials include polystyrene, styrene-divinylbenzene, polymethyl methacrylate, and the like. The inorganic polymer materials include glass, silica, a magnetic material, and the like. The metal includes gold colloid, aluminum, and the like. These microparticles generally have a spherical shape, but in the present technology, it may be non-spherical, and a size, mass, and the like thereof are not particularly limited.

Effects of the Invention

According to the present technology, the sheath liquid can be smoothly set. Note that the effect recited herein is not necessarily limited and may be any one of those recited in the present disclosure.

BRIEF DESCRIPTION OF DRAWINGS

FIG. 7 is a schematic conceptual view schematically illustrating a second embodiment of a microparticle measurement device 100 according to the present technology.

FIGS. 8A and 8B are schematic views illustrating an exemplary configuration of a microparticle measurement chip M that can be used for the microparticle measurement device 100 in FIG. 6.

MODE FOR CARRYING OUT THE INVENTION

Preferred embodiments to carry out the present technology will be described below with reference to the drawings. Note that the embodiments described below illustrate examples of representative embodiments of the present technology and the scope of the present technology should not be interpreted to be limited by these embodiments. Note that the description will be provided in the following order.

1. Fluid Control Device 1
(1) Support Portion 11
(2) Sealed Portion 12
(3) Liquid Drain Unit 3
(4) Installation Table 4
2. Microparticle Measurement Device 100
(1) Flow Path P
(1-1) Microparticle Measurement Chip M
(1-2) Flow Cell P
(2) Sample Feeding Unit 101
(3) Fluid Control Unit 102
(4) Connection Member C
(5) Light Emission Unit 103
(6) Light Detection Unit 104
(7) Analysis Unit 105
(8) Sorting Unit 106 (Including Charging Unit 1061)
(9) Storage Unit 107
(10) Display Unit 108
(11) Input Unit 109
(12) Control Unit 110
(13) Others
3. Fluid Control Method
1. Fluid Control Device 1

Figure 1:
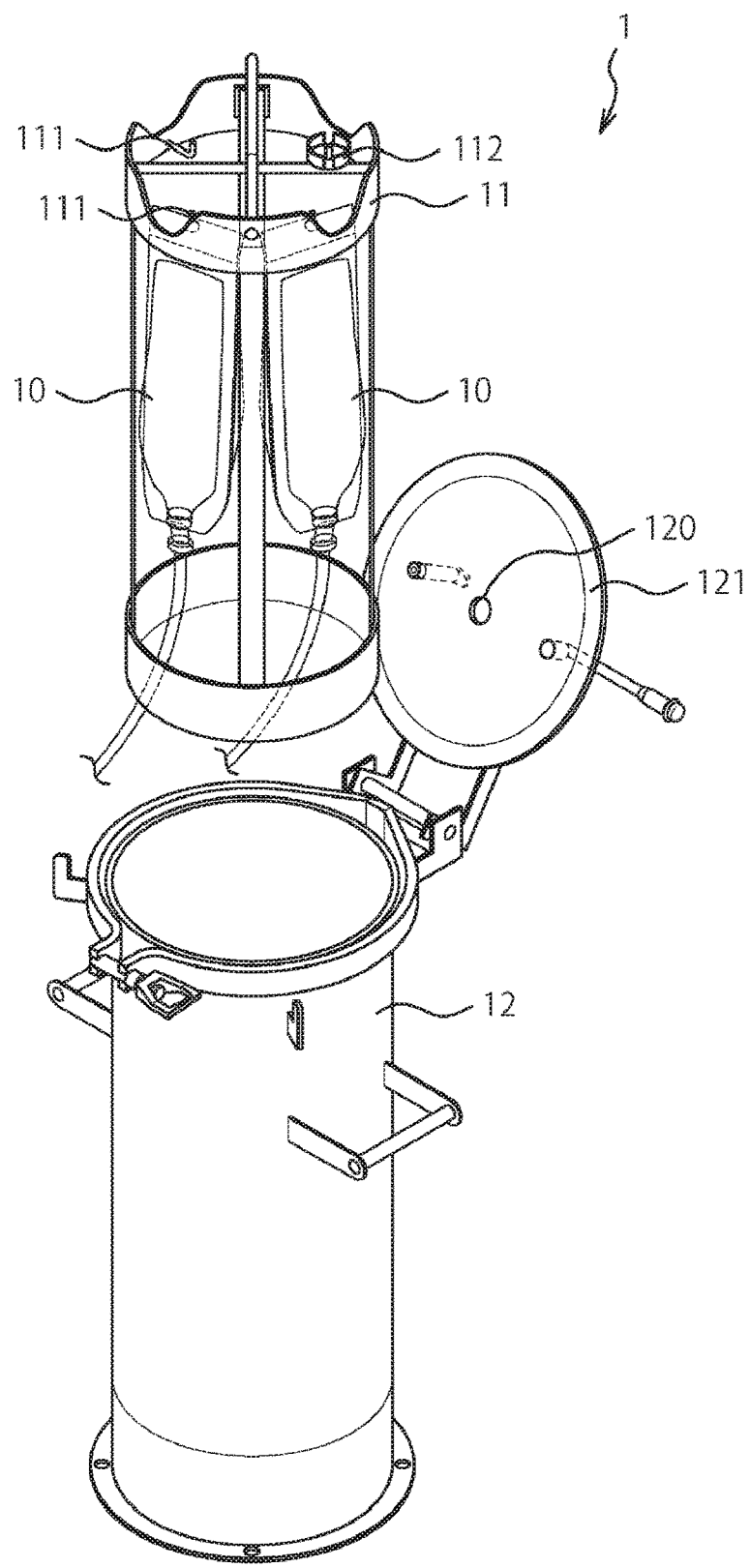
FIG. 1 is a schematic view illustrating an example of an embodiment of a fluid control device 1 according to the present technology.
Figure 2:
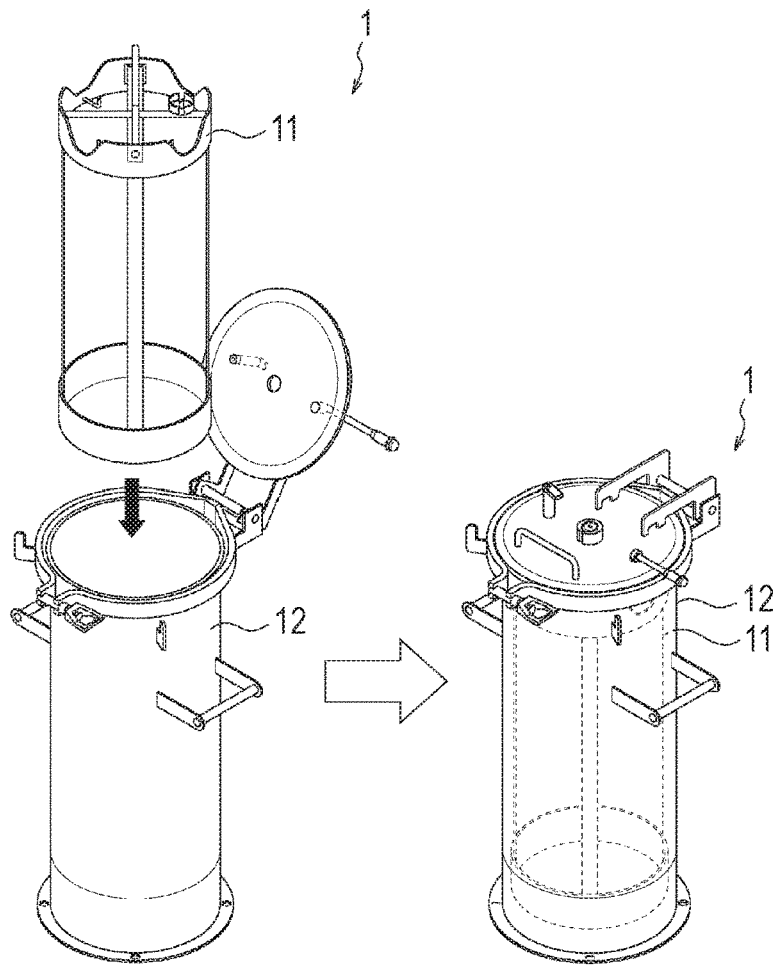
FIG. 2 is a schematic view illustrating an exemplary state in which a support portion 11 is installed in a sealed portion 12.

FIG. 1 is a perspective view illustrating an example of an embodiment of a fluid control device 1 according to the present technology. Additionally, FIG. 2 is a schematic view illustrating an exemplary state in which a support portion 11 is installed in a sealed portion 12. The fluid control device 1 according to the present technology at least includes the support portion 11 and the sealed portion 12. Additionally, other portions may also be provided as needed. Note that, in FIG. 1, a sheath liquid storage unit 10 is illustrated for convenience, but the sheath liquid storage unit 10 is not necessarily included in the present technology.

Each of the units will be described in detail below.

(1) Support Portion 11

The support portion 11 supports the sheath liquid storage unit 10. A form of the sheath liquid storage unit 10 is not particularly limited, and for example, a bag-like shape is assumed. Preferably, the support portion 11 has a configuration capable of supporting two or more sheath liquid storage units 10.

Additionally, the support portion 11 is detachable from the sealed portion 12. With this configuration, only the support portion 11 can be carried around, and therefore, an operator does not need to carry an entire sheath tank, and a burden on the operator is reduced. Furthermore, a tube can be easily attached to the sheath liquid storage unit 10, and the sheath liquid can be smoothly set.

A material that forms the support portion 11 is not particularly limited, and the support portion can include, for example, a metal like aluminum, a synthetic resin, or the like.

Figure 3:
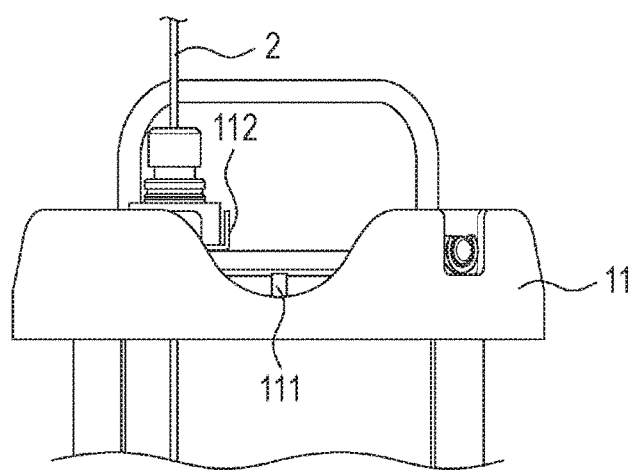
FIG. 3 is a partial enlarged view of the support portion 11.

FIG. 3 is a partial enlarged view of the support portion 11. In the present technology, the support portion 11 further includes an attachment portion 111 where the sheath liquid storage unit 10 is attached, and a position of the attachment portion 111 can be made visible from the outside of the support portion 11. With this configuration, for example, when an operator attaches the sheath liquid storage unit 10 in a clean bench or the like, the attachment is easily performed.

Additionally, as illustrated in FIGS. 1 and 3 and the like, the support portion 11 can further include a place 112 to set a fitting portion described later. With this configuration, work efficiency of an operator in the clean bench or the like is improved.

(2) Sealed Portion 12

The sealed portion 12 houses the support portion 11. Additionally, the sealed portion 12 is characterized in that the sheath liquid stored in the sheath liquid storage unit 10 is controlled by pressurization in order to feed the sheath liquid to the microparticle measurement device.

A material that forms the sealed portion 12 is not particularly limited, and the sealed portion can include, for example, a metal like stainless steel, or the like.

The sealed portion 12 further includes a lid 121 that seals the sheath liquid storage unit 10, and the lid 121 can includes a through hole 120 through which a liquid feeding tube 2 to feed the sheath liquid stored in the sheath liquid storage unit 10 to the microparticle measurement device passes. With this configuration, a risk in that the sheath liquid contacts the outside can be reduced, and cleanliness of the sheath liquid can be secured.

In the present technology, the liquid feeding tube 2 can be provided with the fitting portion to be fitted into the through hole 120. With this configuration, the liquid feeding tube 2 is efficiently fitted into the through hole 120, and work efficiency of an operator can be improved. Also, cleanliness of the sheath liquid can be secured.

For example, the liquid feeding tube 2 can be fixed by making the liquid feeding tube pass through the through hole 120 from a back surface of the lid 121, pushing the fitting portion to the lid 121, and fastening a screw to the fitting portion from an upper surface of the lid 121. With this configuration, a sealing property of the sealed portion 12 can be ensured.

In the present technology, in a case where there are two or more sheath liquid storage units 10, the liquid feeding tube 2 can have a tube structure branched into a plurality of tubes connectable to the respective sheath liquid storage units 10 such that the sheath liquid is fed to the microparticle measurement device via the one through hole 120 from the respective sheath liquid storage units 10. Additionally, the liquid feeding tube 2 can have a configuration branched at the fitting portion.

The liquid feeding tube 2 can be detached from the fluid control device 1 and can be made disposable in every sterilization treatment or every experiment. With this configuration, a risk of sample contamination can be further reduced.

(3) Liquid Drain Unit 3

The fluid control device 1 according to the present technology may further include a liquid drain unit 3 that stores liquid drained from the microparticle measurement device. With this configuration, usability is improved.

(4) Installation Table 4

Figure 4:
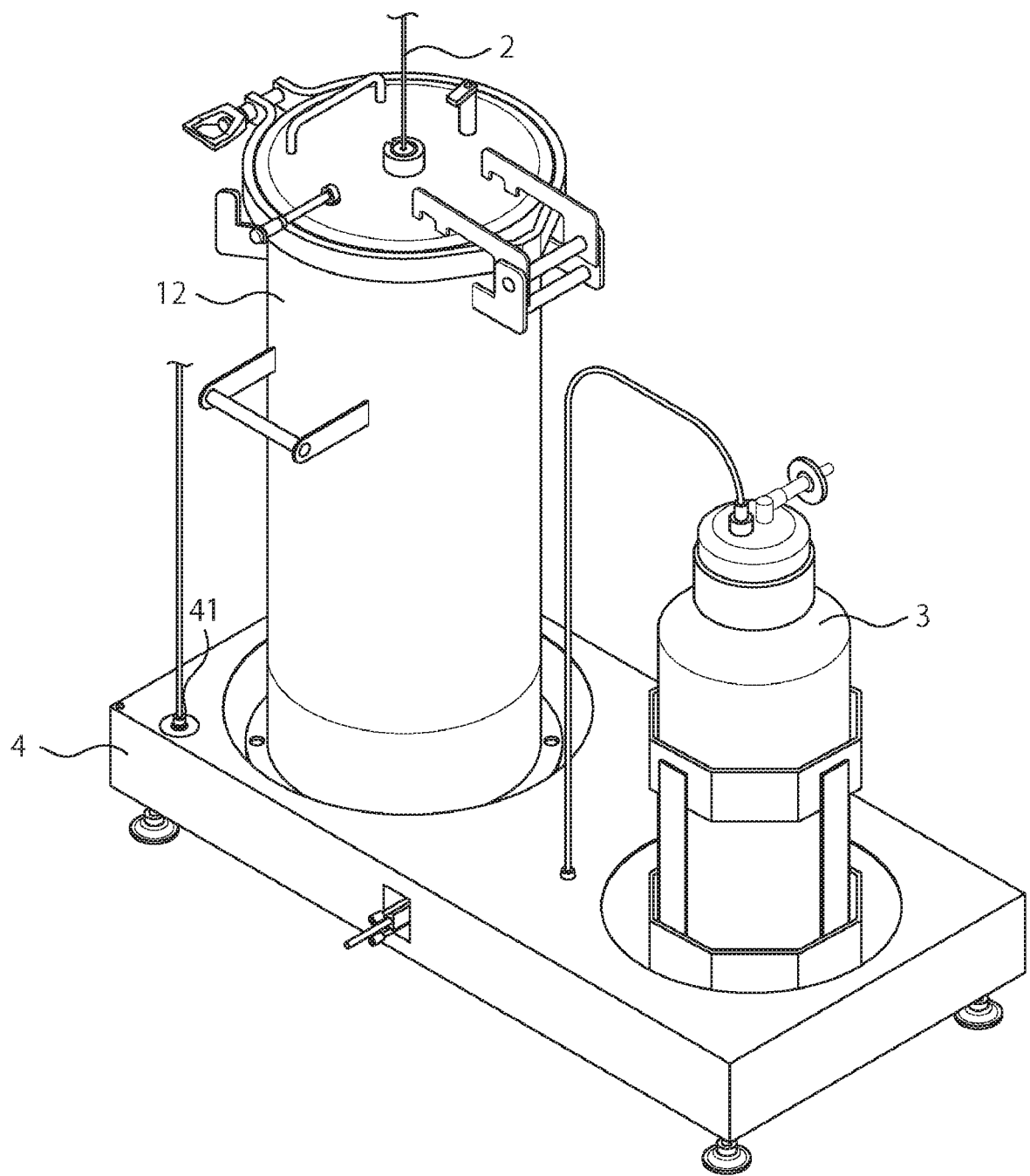
FIG. 4 is a schematic view illustrating an exemplary state in which the sealed portion 12 and a liquid drain unit 3 are installed on an installation table 4.

FIG. 4 is a schematic view illustrating an exemplary state in which the sealed portion 12 and the liquid drain unit 3 are installed on an installation table 4. The fluid control device 1 according to the present technology may further include the installation table 4 on which the sealed portion 12 and the liquid drain unit 3 are installed. With this configuration, the sealed portion 12 and the liquid drain unit 3 can be integrally controlled.

In the present technology, the installation table 4 may further include a drain control unit that controls storage of liquid to be drained to the liquid drain unit 3.

A form of the drain control unit is not particularly limited and can include, for example, a pump function, a control function for a flow rate and/or a flow speed, and the like.

Additionally, in the present technology, the installation table 4 may further include a connection portion 41 to connect a liquid drain tube that drains liquid from the microparticle measurement device to the liquid drain unit 3. Since the drain control unit and the connection portion 41 are included in the installation table 4, the entire liquid drain tube that connects the microparticle measurement device to the liquid drain unit 3 can be made disposable in every sterilization treatment or every experiment, and the risk of sample contamination can be further reduced.

Figure 5:
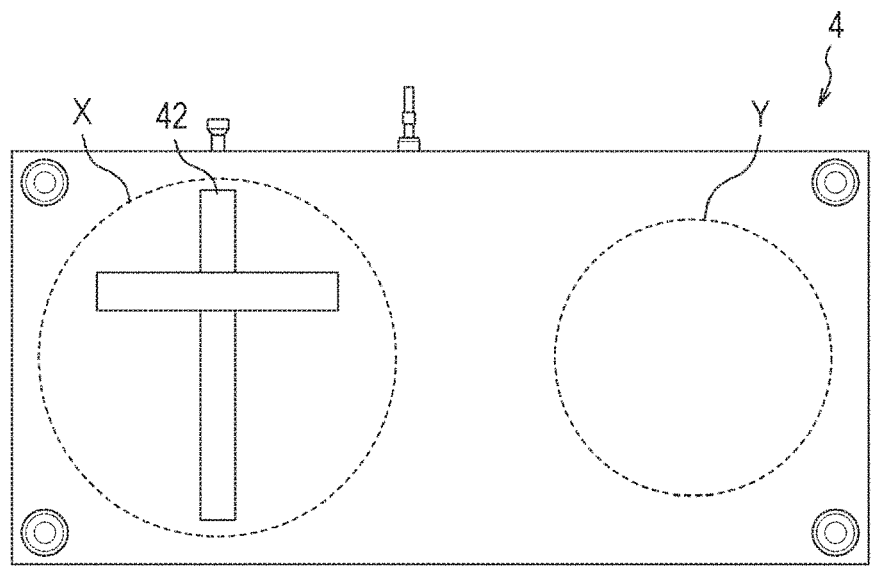
FIG. 5 is a schematic view of the installation table 4 viewed from above.

FIG. 5 is a schematic view of the installation table 4 viewed from above. In the present technology, as illustrated in FIG. 5, the installation table 4 may further include a vibration control unit 42 that controls vibration of the sealed portion 12. With this configuration, shaking of the sealed portion 12 can be suppressed, usability can be improved, and measurement accuracy can be improved. Note that, in FIG. 5, the sealed portion 12 is provided in a portion indicated by X, and a liquid drain unit 3 is provided in a portion indicated by Y.

A form of the vibration control unit 42 is not particularly limited and may be, for example, a reinforcement plate having a cross shape or the like as illustrated in FIG. 5.

2. Microparticle Measurement Device 100

Figure 6:
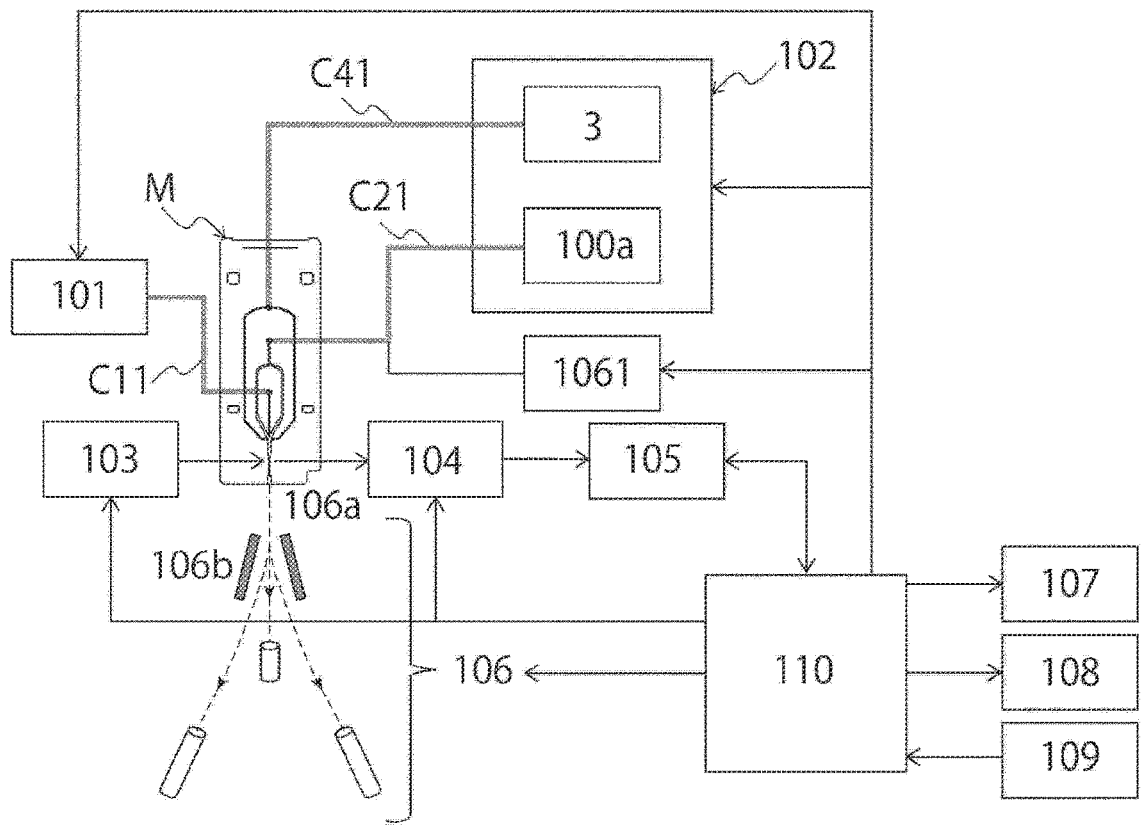
FIG. 6 is a schematic conceptual diagram schematically illustrating a first embodiment of a microparticle measurement device 100 according to the present technology.

FIG. 6 is a schematic conceptual diagram schematically illustrating a first embodiment of a microparticle measurement device 100 according to the present technology, and FIG. 7 is a schematic diagram illustrating a second embodiment of a microparticle measurement device 100 according to the present technology. The microparticle measurement device 100 according to the present technology is at least coupled with the fluid control device 1 according to the present technology. Additionally, as needed, a flow path P, a sample feeding unit 101, a light emission unit 103, a light detection unit 104, an analysis unit 105, a sorting unit 106, a charging unit 1061, a storage unit 107, a display unit 108, an input unit 109, a control unit 110, and the like may be provided.

In FIG. 6, a liquid feeding tube C11 capable of feeding liquid from the sample feeding unit 101, a liquid feeding tube C21 capable of feeding liquid from a sheath liquid feeding unit 100a, and a liquid drain tube C41 capable of draining liquid to the liquid drain unit 3 are detachable as needed, and these tubes may be thrown away after one-time use (disposable). Furthermore, a microparticle measurement chip M described later can also be similarly handled, as needed.

Each of the units will be described in detail below.

(1) Flow Path P

The flow path P may be provided in advance in the microparticle measurement device 100 according to the present technology, but analysis or sorting can be performed by installing, in the microparticle measurement device 100, a commercially available flow path P, a disposable chip provided with a flow path P, or the like.

A form of the flow path P that can be used for the microparticle measurement device 100 according to the present technology is not particularly limited and can be freely designed. For example, not limited to the flow path P formed in, for example, a two-dimensional or three-dimensional plastic or glass substrate as illustrated in the microparticle measurement device 100 of FIG. 6, a flow path P including a flow cell used in a conventional flow cytometer as illustrated in the microparticle measurement device 100 of FIG. 7 can also be used in the microparticle measurement device 100 according to the present technology.

Additionally, a flow path width, a flow path depth, and a cross-sectional shape of the flow path P are also not particularly limited and can be freely designed as far as the flow path can form a laminar flow. For example, a micro flow path having a flow path width of 1 mm or less can also be used for the microparticle measurement device 100 according to the present technology. Particularly, a micro flow path having a flow path width of about 10 μm or more and about 1 mm or less can be preferably used in the microparticle measurement device 100 according to the present technology.

(1-1) Microparticle Measurement Chip M

Figure 9A:
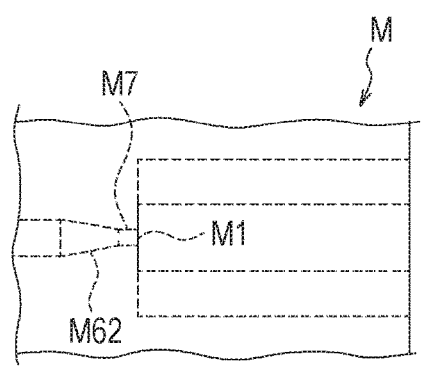
FIGS. 9A, 9B, and 9C are schematic views illustrating an exemplary configuration of an orifice M1 of the microparticle measurement chip M that can be used for the microparticle measurement device 100 in FIG. 6.
Figure 9B:
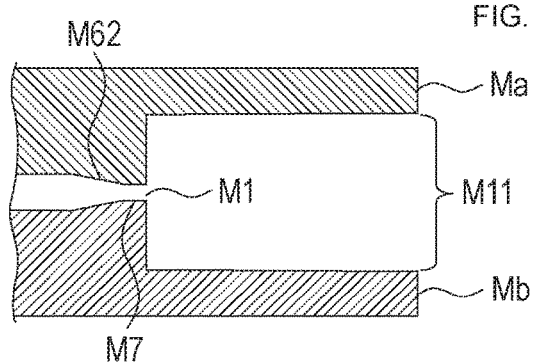
Figure 9C:
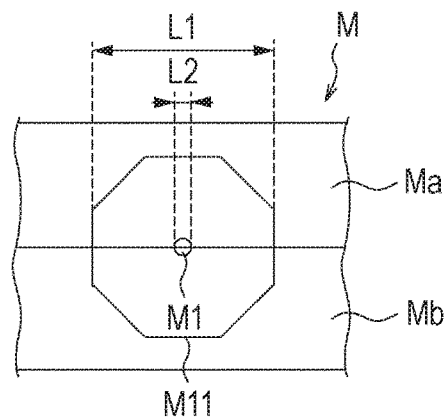

FIGS. 8A and 8B are schematic views illustrating an exemplary configuration of the microparticle measurement chip M that can be used for the microparticle measurement device 100 of FIG. 6, and FIGS. 9A, 9B, and 9C are schematic views illustrating an exemplary configuration of an orifice M1 of the microparticle measurement chip M that can be used for the microparticle measurement device 100 of FIG. 6. A in FIG. 8A illustrates a schematic top view, and FIG. 8B illustrates a schematic cross-sectional view corresponding to a cross-section P-P in FIG. 8A. Also, FIG. 9A illustrates a top view, FIG. 9B a cross-sectional view, and FIG. 9C a front view. Note that FIG. 9B corresponds to the cross-section P-P in FIG. 8A.

The microparticle measurement chip M is formed by bonding substrate layers Ma and Mb where a sample flow path M2 is formed. The sample flow path M2 can be formed on the substrate layers Ma and Mb by performing injection molding with a thermoplastic resin by using a metal mold. As the thermoplastic resin, it is possible to adopt plastic conventionally known as a material of a microparticle measurement chip, such as polycarbonate, polymethylmethacrylate resin (PMMA), cyclic polyolefin, polyethylene, polystyrene, polypropylene, or polydimethylsiloxane (PDMS).

Additionally, in the microparticle measurement chip M, a sample introduction unit M3 to introduce a sample containing a microparticle, a sheath introduction unit M4 to introduce sheath liquid, and the sample flow path M2 in which a sample flow is introduced and joined with the sheath liquid are formed. The sheath liquid introduced from the sheath introduction unit M4 is fed while being separated in two directions, and then joined with the sample liquid in a manner interposing the sample liquid between the two directions at a joined portion with the sample liquid introduced from the sample introduction unit M3. Consequently, a three-dimensional laminar flow in which the sample liquid laminar flow is positioned in a middle of the sheath liquid laminar flows is formed at the joint portion.

Reference sign M5 illustrated in FIG. 8A indicates a suction flow path to eliminate clogging or air bubbling by temporarily reversing a flow by applying negative pressure to the inside of the sample flow path M2 when such clogging or air bubbling occurs in the sample flow path M2. The suction flow path M5 has one end formed with a suction open portion M51 connected to a negative pressure source such as a vacuum pump or the like. Additionally, the suction flow path M5 has the other end connected to the sample flow path M2 at a communication port M52.

A laminar flow width of the three-dimensional laminar flow is narrowed at narrowed portions M61 (refer to FIGS. 8A and 8B) and M62 (refer to FIG. 9B) each formed such that the area of a vertical cross-section relative to a liquid feeding direction is gradually reduced from an upstream side to a downstream side of the liquid feeding direction. After that, the three-dimensional laminar flow is drained as a fluid stream from the orifice M1 provided at the one end of the flow path.

The fluid stream ejected from the orifice M1 is made into droplets by applying vibration to the orifice M1 by a vibration element 106a described below. The orifice M1 is opened in a direction to end surfaces of the substrate layers Ma and Mb, and a cut-away portion M11 is provided between the opened position and the end surfaces of the substrate layers. The cut-away portion M11 is formed by cutting the substrate layers Ma and Mb between the opened position of the orifice M1 and the substrate end surfaces such that a diameter L1 of the cut-away portion M11 becomes larger than an open diameter L2 of the orifice M1 (refer to FIG. 9C). Preferably, the diameter L1 of the cut-away portion M11 is formed twice or more than the open diameter L2 of the orifice M1 so as not to hinder movement of a droplet ejected from the orifice M1.

(1-2) Flow Cell

The flow cell includes: a sample introduction unit to introduce a sample; a sheath introduction unit to introduce sheath liquid; a flow path forming a laminar flow in which sheath liquid and the sample are joined and a sample liquid laminar flow is positioned in the middle of sheath liquid laminar flows; and an orifice. A fluid stream is effluent from the orifice, and characteristics of a microparticle are detected by the later-described light emission unit 103 and light detection unit 104 included in the microparticle measurement device 100.

(2) Sample Feeding Unit 101

The sample feeding unit 101 feeds a sample to the sample introduction units M3 and P3 via a sample liquid feeding tube and a sample introduction coupling portion C1 described below. For example, the sample feeding unit 101 can suck and feed a sample via a nozzle from a test tube, a well plate, or the like containing the sample, or can also feed a sample by applying pressure to a housing unit that can house a test tube or the like containing the sample.

(3) Fluid Control Unit 102

Since the fluid control unit 102 corresponds to the fluid control device 1 in the present technology, details thereof will be omitted here. The sheath liquid feeding unit 100a illustrated in FIG. 6 includes: the support portion 11 where the sheath liquid storage unit 10 can be attached; and the sealed portion 12, and for example, the sheath liquid inside the sheath liquid storage unit 10 is fed to the sheath liquid introduction units M4 and P4 by pressure to the sealed portion 12 via the sheath liquid feeding tube (liquid feeding tube 2) and a sheath liquid introduction coupling portion described below.

Additionally, the fluid control unit 102 may include the liquid drain unit 3, and for example, clogging, air bubbles, and the like inside the sample flow path are recovered from the suction open portion M51 via a liquid drain tube and a drain coupling portion C4 by a pump function or the like. Additionally, the liquid drain unit 3 can also be connected to the sorting unit 106 described later in order to suck a droplet not sorted in the sorting unit 106 described below, aerosol, and the like.

Furthermore, the fluid control unit 102 may include an installation table on which the sheath liquid feeding unit 100a and the liquid drain unit 3 can be installed. Since the installation table corresponds to the installation table 4 described above, the description will be omitted here. The drain control unit can be provided on the installation table but can also be provided at a place other than the installation table as a member of the control unit 110 described below.

Additionally, the fluid control unit 102 may be formed separately from the microparticle measurement device 100 or may be formed as a part of the microparticle measurement device 100.

(4) Connection Member C

Figure 10:
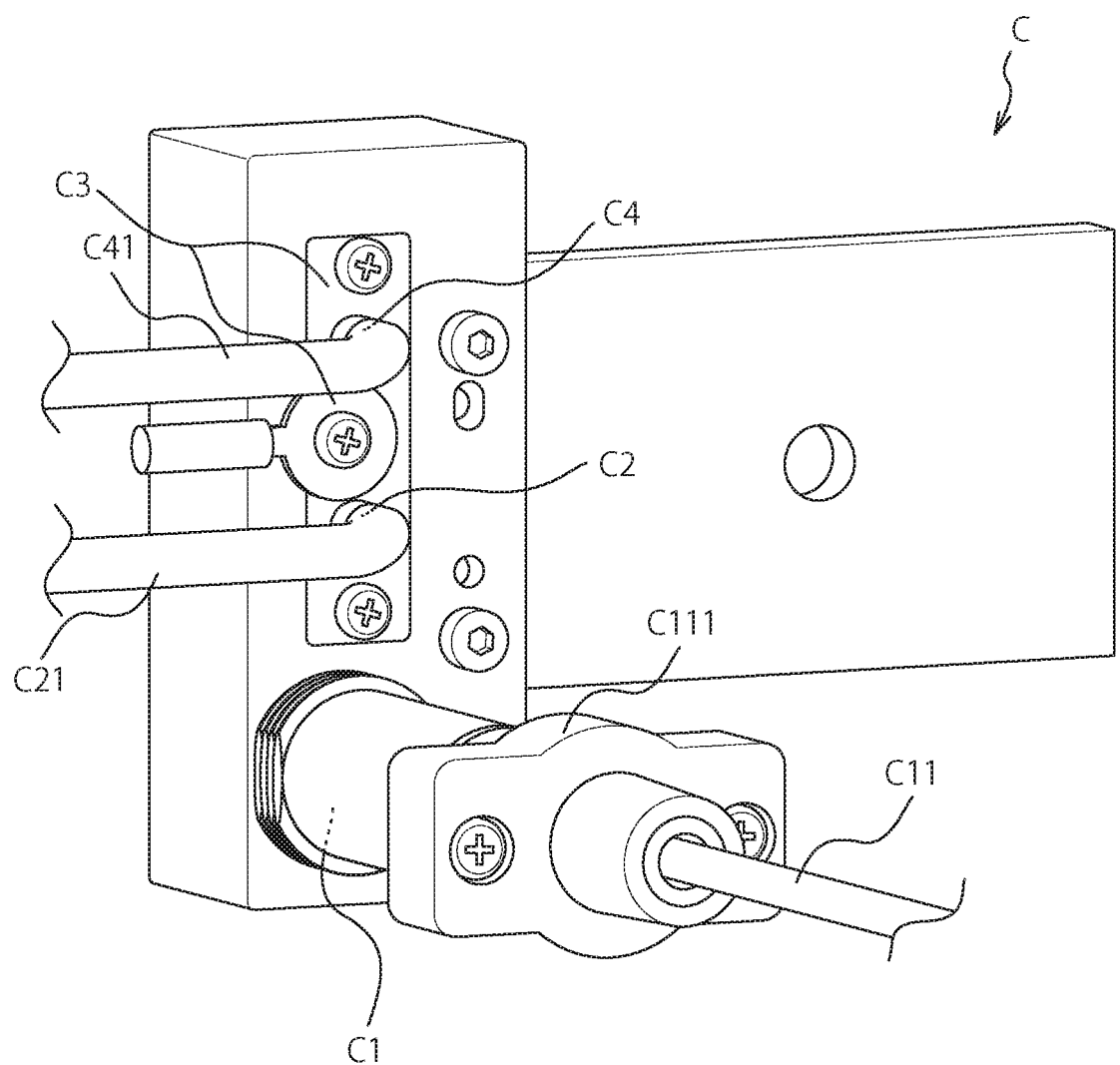
FIG. 10 is a schematic view illustrating an example of an embodiment of a connection member C.

FIG. 10 is a schematic view illustrating an example of an embodiment of the connection member C that connects the microparticle measurement chip M to the sample feeding unit 101/fluid control unit 102 in the microparticle measurement device 100 of FIG. 6. The connection member C of the present embodiment includes: the sample introduction coupling portion C1 coupled to the sample introduction unit M3; the sheath liquid introduction coupling portion C2 coupled to the sheath liquid introduction unit M4; a charging electrode portion C3 to apply electric charge to at least a part of droplets; and the drain coupling portion C4 coupled to the suction open portion M51, and the sample introduction coupling portion C1, the sheath liquid introduction coupling portion C2, and the drain coupling portion C4 are positioned so as to be coupled to respective corresponding positions of the substrate.

Since the connection member C detachable from the microparticle measurement chip M and the microparticle measurement device 100 is used, a portion in contact with the microparticle measurement chip M can be detached and the risk of contamination can be reduced. Additionally, since the above-described microparticle measurement chip M and connection member C are made disposable per sample, labor of cleaning operation performed at the time of changing a sample can be omitted and a burden on an operator can be reduced.

Figure 11:
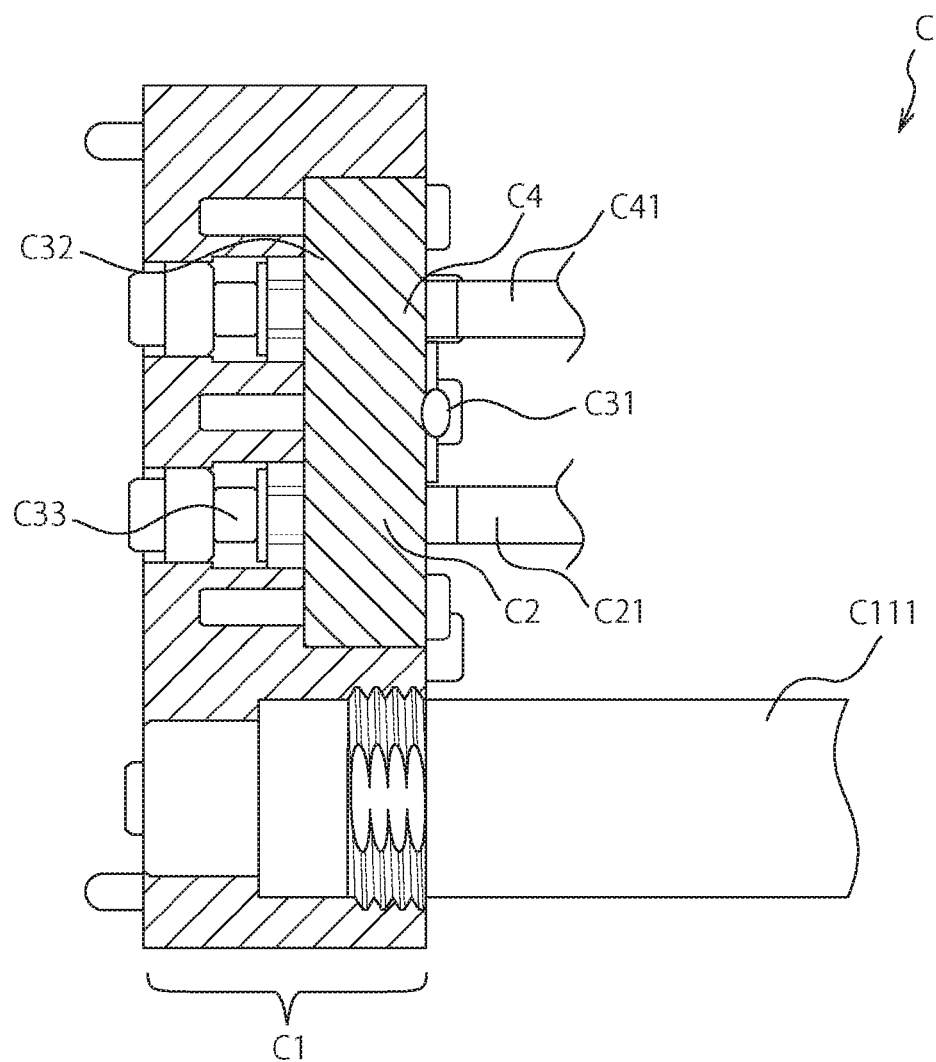
FIG. 11 is a schematic end surface view of the connection member C of the embodiment illustrated in FIG. 10.

Furthermore, the charging electrode portion C3 contacts the sheath liquid introduction coupling portion C2 and can apply electric charge to at least a part of droplets through the sheath liquid. A configuration of the charging electrode portion C3 is not particularly limited, but as illustrated in FIG. 11, can include: connection portions C31/C32 connected to the charging unit 1061; and a contact portion C33 contacting the sheath liquid introduction coupling portion C2, for example. Details of the charging unit 1061 will be described in (8) sorting unit 106.

The connection portions C31/C32 and the contact portion C33 preferably includes metals. Meanwhile, since the metals used for the connection portions C31/C32 and the contact portion C33 are made disposable, labor of cleaning operation performed at the time of changing a sample can be omitted and a burden on an operator can be reduced.

Additionally, as illustrated in FIGS. 10 and 11, the sheath liquid introduction coupling portion C2 also includes: the liquid feeding tube C21 capable of feeding liquid from the sheath liquid feeding unit 100*a*; the liquid feeding tube C11 capable of feeding liquid from the sample feeding unit 101; and the liquid drain tube C41 capable of draining liquid to the liquid drain unit 3. These tubes can also have a similar configuration detachable from the microparticle measurement chip M and the microparticle measurement device 100 and can be made disposable per sample.

(5) Light Emission Unit 103

The light emission unit 103 emits light to a microparticle to be analyzed. A kind of light emitted from the light emission unit 103 is not particularly limited, but light having a constant light direction, a constant wavelength, and constant light intensity is preferable in order to reliably generate fluorescence and scattered light from a particle. Specifically, for example, a laser, an LED, or the like can be exemplified. In a case of using a laser, a kind thereof is not particularly limited, but it is also possible to use one kind or two or more kinds of combination of: an argon (Ar) ion laser, a helium-neon (He—Ne) laser, a dye laser, a krypton (Cr) laser, a semiconductor laser, a solid laser or the like in which a semiconductor laser is combined with a wavelength conversion optical element, or the like.

(6) Light Detection Unit 104

The light detection unit 104 detects light generated from the microparticle. The light detection unit 104 detects light components of fluorescence, forward scattered light, backscattered light, and the like generated from a microparticle in response to light emission to the microparticle from the light emission unit 103. The fluorescence and necessary scattered light components are important light components to obtain optical information (characteristics) of the microparticle.

As far as light from a microparticle can be detected, a type of the light detection unit 104 is not particularly limited and a known photodetector can be freely selected and adopted. For example, one type or two or more types of following measurement instruments can be freely combined and adopted: a fluorescence measurement instrument, a scattered light measurement instrument, a transmitted light measurement instrument, a reflected light measurement instrument, a diffracted light measurement instrument, an ultraviolet spectrometer, an infrared spectrometer, a Raman spectrometer, a FRET measurement instrument, a FISH measurement instrument, other various spectrum measurement instruments, a so-called multi-channel photodetector in which a plurality of photodetectors is arranged in an array, and the like.

Furthermore, in the present technology, the light detection unit 104 preferably has a light receiving element that receives light generated from the microparticle. Examples of the light receiving element can include an area imaging element such as a CCD or a CMOS element, a PMT, a photodiode, and the like.

Furthermore, the light detection unit 104 can include a plurality of light receiving elements having different detection wavelength bands. Since the light detection unit 104 includes the plurality of light receiving elements having the different detection wavelength bands, intensity of light in a continuous wavelength band can be measured as a fluorescence spectrum. Specifically, for example, it is possible to exemplify a PMT array or photodiode array in which light receiving elements are arranged one-dimensionally, or the one in which a plurality of independent detection channels such as two-dimensional light receiving elements like CCDs, CMOSs, or the like are arranged.

(7) Analysis Unit 105

The analysis unit 105 is connected to the light detection unit 104 and analyzes a detection value of light to a microparticle detected by the light detection unit 104.

For example, the analysis unit 105 can correct a detection value of light received from the light detection unit 104 and can calculate a feature quantity of each microparticle. Specifically, the feature quantity indicating a size, a form, an internal structure, and the like of a microparticle is calculated from detection values of the received fluorescence, forward scattered light, and backscattered light. Additionally, a sorting control signal can also be generated by performing sorting determination on the basis of the calculated feature quantity, a sorting condition preliminarily received from the input unit, and the like.

The analysis unit 105 is not an indispensable component in the particle measurement device 100 according to the present technology, and a state and the like of a microparticle can be analyzed by using an external analysis device or the like on the basis of a detection value of light detected by the light detection unit 104. For example, the analysis unit 105 may be implemented by a personal computer or a CPU, and can be made to function by the personal computer or the CPU by further storing the same as a program in a hardware resource including recording media (nonvolatile memory (USB memory and the like), a HDD, a CD, and the like) and the like. Additionally, the analysis unit 105 may be connected to each of the units via a network.

(8) Sorting Unit 106 (Including Charging Unit 1061)

The sorting unit 106 includes at least: the vibration element 106a that generates a droplet; a deflection plate 106b that changes the charged droplet in a desired direction; and a collection container that collects droplets. The charging unit 1061 is separately defined in FIGS. 6 and 7, but the charging unit is a part of the sorting unit 106 and performs charging on the basis of a sorting control signal generated by the analysis unit 105.

In the microparticle measurement device 100 in FIG. 6, the vibration element 106a generates a droplet by applying vibration to the orifice M1 as described above. The charging unit 1061 is connected to the charging electrode portion C3 coupled to the above-described sheath liquid introduction coupling portion C2, and charges positively or negatively the droplet ejected from the orifice M1 of the microparticle measurement chip M on the basis of a sorting control signal generated by the analysis unit 105.

On the other hand, in the microparticle measurement device 100 illustrated in FIG. 7, the vibration element 106a generates a droplet by applying vibration to a fluid stream ejected from the orifice M1, and the charging unit 1061 positively or negatively charges the droplet on the basis of a sorting control signal generated by the analysis unit 105.

Then, an advancing direction of the charged droplet is changed and sorted in a desired direction by the deflection plate (counter electrode) 106b to which voltage is applied.

Note that the vibration element 106a to be used is not particularly limited and any known vibration element can be freely selected and used. As an example, a piezo vibration element or the like can be exemplified. Additionally, a size of a droplet can be adjusted by adjusting a liquid feeding amount to the flow path P, a diameter of an ejection port, a vibration frequency of the vibration element 106a, and the like, and a droplet containing a constant amount of microparticles can be generated.

(9) Storage Unit 107

The storage unit 107 stores all of matters related to measurement such as a value detected by the light detection unit 104, a feature quantity calculated by the analysis unit 105, a sorting control signal, a sorting condition input from the input unit 109, and the like.

In the microparticle measurement device 100, the storage unit 107 is not an indispensable component, and an external storage device may also be connected. As the storage unit 107, for example, a hard disk or the like can be used. Furthermore, the storage unit 107 may be connected to each of the units via a network.

(10) Display Unit 108

The display unit 108 can display all of matters related to measurement such as a value detected by the light detection unit 104, a feature quantity calculated by the analysis unit 105, and the like. Preferably, the display unit 108 can display, as a scattergram, a feature quantity calculated by the analysis unit 105 for each microparticle.

In the microparticle measurement device 100, the display unit 108 is not an indispensable component, and an external display device may be connected. As the display unit 108, for example, a display, a printer, or the like can also be used.

(11) Input Unit 109

The input unit 109 is a portion operated by a user such as an operator. A user can access the control unit 110 through the input unit 109 to control each of the units of the microparticle measurement device 100 according to the present technology. Preferably, the input unit 109 can set an attention area for a scattergram displayed on the display unit and determine a sorting condition.

In the microparticle measurement device 100, the input unit 109 is not an indispensable component, and an external operating device may also be connected. As the input unit 109, for example, a mouse, a keyboard, or the like can also be used.

(12) Control Unit 110

The control unit 110 is configured capable of controlling each of the sample feeding unit 101, fluid control unit 102, light emission unit 103, light detection unit 104, analysis unit 105, sorting unit 106, charging unit 1061, storage unit 107, display unit 108, and input unit 109. The control unit 110 may be provided separately for each of the units, and furthermore, may be provided outside the microparticle measurement device 100. For example, the control unit may be implemented by a personal computer or a CPU, and can be made to function by the personal computer or the CPU by further storing the same as a program in a hardware resource including recording media (nonvolatile memory (USB memory and the like), HDD, CD, and the like) and the like. Additionally, the control unit 110 may be connected to each of the units via a network.

(13) Others

The microparticle measurement device 100 according to the present technology can be housed in a biosafety cabinet. Since the microparticle measurement device is housed in the biosafety cabinet, it is possible to prevent: scattering to a surrounding area including a user; and sample contamination. The fluid control device 1 according to the present technology is not necessarily housed in the biosafety cabinet and can be connected to the microparticle measurement device 100 via each tube at an opened portion on a wall surface of the biosafety cabinet.

Additionally, each of the units of the microparticle measurement device 100 has a configuration that can be cleaned in order to prevent sample contamination. Particularly, a housing including the sample feeding unit 101, flow path P, and sorting unit 106 which may contact a sample preferably has a configuration that can be cleaned.

3. Fluid Control Method

In a fluid control method according to the present technology, at least the support portion 11 that supports the sheath liquid storage unit 10 and the sealed portion 12 that houses the support portion 11 are used, the support portion 11 is detachable from the sealed portion 12, and the sealed portion 12 is controlled by pressurization in order to feed the sheath liquid stored in the sheath liquid storage unit 10 to the microparticle measurement device. Since the support portion 11 and the sealed portion 12 correspond to those described above, the description thereof will be omitted here.

Note that the present technology can have following configurations as well.

(1)

A fluid control device including at least:

a support portion that supports a sheath liquid storage unit; and a sealed portion that houses the support portion, in which the support portion is detachable from the sealed portion, and the sealed portion is controlled by pressurization in order to feed sheath liquid stored in the sheath liquid storage unit to a microparticle measurement device.

(2)

The fluid control device recited in (1), in which the support portion further includes an attachment portion to attach the sheath liquid storage unit, and a position of the attachment portion is visible from the outside of the support portion.

(3)

The fluid control device recited in (1) and (2), in which the sealed portion further includes a lid that seals the sheath liquid storage unit, and the lid includes a through hole through which a liquid feeding tube to feed sheath liquid stored in the sheath liquid storage unit to the microparticle measurement device passes.

(4)

The fluid control device recited in (3), in which the liquid feeding tube is provided with a fitting portion to be fitted into the through hole.

(5)

The fluid control device recited in (4), in which the support portion further includes a place to set the fitting portion.

(6)

The fluid control device recited in any one of (1) to (5), further including a liquid drain unit that stores liquid drained from the microparticle measurement device.

(7)

The fluid control device recited in (6), further including an installation table on which the sealed portion and the liquid drain unit are installed.

(8)

The fluid control device recited in (7), in which the installation table further includes a drain control unit that controls storage of liquid to be drained to the liquid drain unit.

(9)

The fluid measurement device recited in (7) or (8), in which the installation table further includes a connection portion to connect a liquid drain tube that drains liquid to the liquid drain unit from the microparticle measurement device.

(10)

The fluid measurement device recited in any one of (7) to (9), in which the installation table further includes a vibration control unit that controls vibration of the sealed portion.

(11)

A microparticle measurement device to which the fluid control device recited in any one of (1) to (10) is connected.

(12)

A fluid control method using at least:

a support portion that supports a sheath liquid storage unit; and a sealed portion that houses the support portion, the support portion being detachable from the sealed portion, the method including controlling the sealed portion by pressurization in order to feed sheath liquid stored in the sheath liquid storage unit to a microparticle measurement device.

REFERENCE SIGNS LIST

1 Fluid control device
10 Sheath liquid storage unit
11 Support portion
111 Attachment portion
112 Place
12 Sealed portion
120 Through hole
121 Lid
2 Liquid feeding tube
3 Liquid drain unit
4 Installation table
41 Connection portion
42 Vibration control unit
100 Microparticle measurement device
100a Sheath liquid feeding unit
101 Sample feeding unit
102 Fluid control unit
103 Light emission unit
104 Light detection unit
105 Analysis unit
106 Sorting unit
106a Vibration element
106b Deflection plate
1061 Charging unit
107 Storage unit
108 Display unit
109 Input unit
110 Control unit
P Flow path
M Microparticle measurement chip
Ma, Mb Substrate layer
M1 Orifice
M11 Cut-away portion
M2 Sample flow path
M3 Sample introduction unit
M4 Sheath introduction unit
M5 Suction flow path
M51 Suction open portion
M52 Communication port
M61, M62 Narrowed portion
M7 Straight portion
L1 Diameter of cut-away portion M11
L2 Open diameter of orifice M1
C Connection member
C1 Sample introduction coupling portion
C11 Liquid feeding tube capable of feeding liquid from sample feeding unit
C111 Tube fixing portion
C2 Sheath liquid introduction coupling portion
C21 Liquid feeding tube capable of feeding liquid from sheath liquid feeding unit
C3 Charging electrode portion
C31, C32 Connection portion
C33 Contact portion
C4 Drain coupling portion
C41 Liquid drain tube capable of draining liquid to liquid drain unit

The invention claimed is:

1. A fluid control device, comprising: a support portion configured to support a sheath liquid storage unit, wherein the sheath liquid storage unit stores sheath liquid; and a sealed portion configured to house the support portion, wherein the sealed portion includes a lid configured to seal the sheath liquid storage unit, the lid includes a through hole through which a liquid feeding tube passes, the liquid feeding tube comprises a fitting portion configured to fit into the through hole, the support portion includes a place configured to set the fitting portion of the liquid feeding tube, such that the fitting portion is pushed against the lid, thereby fastening a screw to the fitting portion from an upper surface of the lid, the support portion is detachable from the sealed portion, and the sealed portion is controlled based on pressurization to feed the sheath liquid stored in the sheath liquid storage unit to a microparticle measurement device.

2. The fluid control device according to claim 1, wherein the support portion further includes an attachment portion configured to attach the sheath liquid storage unit, and a position of the attachment portion is visible from outside of the support portion.

3. The fluid control device according to claim 1, wherein the liquid feeding tube feeds the sheath liquid-stored in the sheath liquid storage unit to the microparticle measurement device.

4. The fluid control device according to claim 1, further comprising a liquid drain storage configured to store liquid drained from the microparticle measurement device.

5. The fluid control device according to claim 4, further comprising an installation table on which the sealed portion and the liquid drain storage are installed.

6. The fluid control device according to claim 5, wherein the installation table includes a control function configured to control storage of the liquid to be drained to the liquid drain storage.

7. The fluid control device according to claim 5, wherein the installation table further includes a connection portion configured to connect a liquid drain tube that drains the liquid to the liquid drain storage from the microparticle measurement device.

8. The fluid control device according to claim 5, wherein the installation table further includes a reinforcement plate configured to control vibration of the sealed portion.

9. A system, comprising:
a microparticle measurement device; and
a fluid control device connected to the microparticle measurement device,
wherein the fluid control device includes:
a support portion configured to support a sheath liquid storage unit,
wherein the sheath liquid storage unit stores sheath liquid; and
a sealed portion configured to house the support portion, wherein
the sealed portion includes a lid configured to seal the sheath liquid storage unit,
the lid includes a through hole through which a liquid feeding tube passes,
the liquid feeding tube comprises a fitting portion configured to fit into the through hole,
the support portion includes a place configured to set the fitting portion of the liquid feeding tube,
the support portion is detachable from the sealed portion, and
the sealed portion is controlled based on pressurization to feed the sheath liquid stored in the sheath liquid storage unit to the microparticle measurement device.

10. A fluid control method, comprising:
in a fluid control device that includes: a support portion configured to support a sheath liquid storage unit; and a sealed portion configured to house the support portion, wherein the sheath liquid storage unit stores sheath liquid, and the support portion is detachable from the sealed portion:
sealing the sheath liquid storage unit in the sealed portion via a lid of the sealed portion;
passing a liquid feeding tube through a through hole in the lid, wherein
the liquid feeding tube comprises a fitting portion configured to fit into the through hole, and
the support portion includes a place configured to set the fitting portion of the liquid feeding tube; and
controlling the sealed portion based on pressurization to feed the sheath liquid stored in the sheath liquid storage unit to a microparticle measurement device.

* * * * *